United States Patent
Koskimaki et al.

(10) Patent No.: US 12,330,281 B2
(45) Date of Patent: Jun. 17, 2025

(54) PISTON GUIDING ELEMENT, ROCK DRILLING MACHINE AND METHOD

(71) Applicant: SANDVIK MINING AND CONSTRUCTION OY, Tampere (FI)

(72) Inventors: Antti Koskimaki, Tampere (FI); Lars Kandelin, Tampere (FI); Mikko Hamalainen, Tampere (FI); Timo Kela, Tampere (FI); Matti Viinikka, Tampere (FI); Esa Laakkola, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 142 days.

(21) Appl. No.: 17/928,683

(22) PCT Filed: Jun. 1, 2021

(86) PCT No.: PCT/EP2021/064647
§ 371 (c)(1),
(2) Date: Nov. 30, 2022

(87) PCT Pub. No.: WO2021/245065
PCT Pub. Date: Dec. 9, 2021

(65) Prior Publication Data
US 2023/0294260 A1    Sep. 21, 2023

(30) Foreign Application Priority Data
Jun. 1, 2020 (EP) .................................. 20177658

(51) Int. Cl.
*B25D 17/06* (2006.01)
*B25D 9/12* (2006.01)
*E21B 1/26* (2006.01)

(52) U.S. Cl.
CPC ............ *B25D 17/06* (2013.01); *B25D 9/12* (2013.01); *E21B 1/26* (2020.05); *B25D 2217/0019* (2013.01); *B25D 2250/125* (2013.01); *B25D 2250/331* (2013.01)

(58) Field of Classification Search
USPC .......................................................... 173/1
See application file for complete search history.

(56) References Cited

U.S. PATENT DOCUMENTS

| | | | |
|---|---|---|---|
| 2,536,424 A | 1/1951 | Curtis | |
| 3,424,065 A * | 1/1969 | Kurt | F16C 29/02 384/31 |
| 4,828,048 A | 5/1989 | Mayer et al. | |
| 2016/0003372 A1* | 1/2016 | Leino | E21B 4/14 251/12 |

FOREIGN PATENT DOCUMENTS

| | | |
|---|---|---|
| EP | 1632636 A1 | 3/2006 |
| EP | 3409878 A1 | 12/2018 |

* cited by examiner

*Primary Examiner* — Chinyere J Rushing-Tucker
(74) *Attorney, Agent, or Firm* — Corinne R. Gorski

(57) ABSTRACT

A piston guiding element, rock drilling machine and method for supporting a front end portion of a percussion piston of a rock drilling machine. The piston guiding element includes a braking recess at its rear end. The element further includes at least one bearing sleeve, which is provided with two axially successive slide bearing sections. Hydraulic fluid is conveyed between the slide bearing sections via a feed system.

14 Claims, 5 Drawing Sheets

PISTON GUIDING ELEMENT, ROCK DRILLING MACHINE AND METHOD

RELATED APPLICATION DATA

This application is a § 371 National Stage Application of PCT International Application No. PCT/EP2021/064647 filed Jun. 1, 2021 claiming priority to EP 20177658.0 filed Jun. 1, 2020.

BACKGROUND OF THE INVENTION

The invention relates to a piston guiding element of a rock drilling machine. The element is intended for providing bearing for a front part of a percussion piston.

The invention further relates to a rock drilling machine and method of supporting a front end portion of a percussion piston.

In mines and at other work sites different type of rock drilling rigs are used. The rock drilling rigs are provided with one or more booms and rock drilling machines are arranged at distal ends of the booms. The rock drilling machine comprises an impact device provided with an impact piston which is supported to a body of the machine by means of bearing means. In hydraulic impact devices front bearings of the piston are subjected to great pressure peaks especially when movement of the piston in impact direction needs to be stopped by means of a braking recess located at a front part of the impact device. Different kind of solutions have already been disclosed to eliminate the pressure peaks which are harmful for the bearings. However, the known solutions have shown some disadvantages.

BRIEF DESCRIPTION OF THE INVENTION

An object of the invention is to provide a novel and improved piston guiding element, a rock drilling machine equipped with such element and a method for supporting a front end of a percussion piston.

An idea of the disclosed solution is that the piston guiding element is a sleeve-like piece mountable inside a body of the rock drilling machine between the percussion piston and the body. The element comprises a first end facing towards an impact direction and a second end facing towards a return direction. The second end is provided with a braking recess which can receive a collar of the piston. Further, the element comprises at least one separate bearing sleeve mounted inside the body of the element and is provided with a first axial section and a second axial section. Both sections comprise slide bearing material. Between the mentioned axial sections and on an inner surface of the element is a first groove bottom of which comprises at least one radial opening between a bottom of the first groove and an outer surface of the element. Hydraulic fluid can be conveyed by means of the at least one radial opening and the first groove between the mentioned two successive slide bearing sections.

An advantage of the disclosed solution is that magnitudes of the pressure peaks directed to the bearings can be lowered when hydraulic pressure fluid is directed between the two axial bearing sections. Moreover, temperature of the bearings can be lowered when hydraulic fluid is conveyed to the bearings elsewhere than form the braking recess. Further, the disclosed structure is simple, and is also easy to manufacture and mount.

According to an embodiment, the mentioned at least one separate bearing sleeve is made of slide bearing material.

The slide bearing material may be of suitable metallic bearing material, for example.

According to an embodiment, bronze-alloy material is used as the above mentioned slide bearing material. The bronze-alloy may be tin bronze, leaded tin bronze, aluminum bronze or manganese bronze, for example.

According to an embodiment, cast iron is used as the mentioned slide bearing material. The cast iron may be grey cast iron, for example.

According to an embodiment, an inner surface of the at least one bearing sleeve comprises at least one layer which is made of at least one slide bearing material.

According to an embodiment, the mentioned inner surface of the bearing sleeve or bearing section is coated with a slide bearing material.

According to an embodiment, the mentioned at least one bearing sleeve has a bi-metal configuration comprising a sleeve made of steel and provided with a layer of bronze on an inner surface of the sleeve, and wherein between the mentioned steel and bronze materials occurs an intermetallic diffusion. Possibly some other metallic materials may also be used for forming the bi-metal structure.

According to an embodiment, the element comprises one single bearing sleeve mounted inside it. Thus, the bearing sleeve is a uniform piece and is provided with the mentioned first and second axial sections for providing support for the piston.

According to an embodiment, the element comprises two separate bearing sleeves mounted successively inside the element. A first bearing sleeve is configured to form the mentioned first axial section and a second bearing sleeve is configured to form the mentioned second axial section. Then the first groove is located between the first and second bearing sleeves. This way the features of the bearing sleeves may be tailored according to need.

According to an embodiment, at least inner surfaces of the mentioned first and second bearing sleeves comprise different materials relative to each other. This way the materials of the sleeves may be selected according to need.

According to an embodiment, the outer surface comprises a second groove and the mentioned at least one radial opening extends to a bottom of the second groove.

According to an embodiment, the outer surface comprises at least one third groove extending from the second end to the second groove.

According to an embodiment, diameter of the outer surface of the element is equal except at the second groove.

According to an embodiment, the element comprises two outer portions with different outer dimensions. Then at the first end portion is a first outer portion with a first outer diameter. At a second portion is a second outer portion with a second outer diameter. The outer diameters are selected so that the mounting of the element is possible. In other words, the outer surface of the element has a stepped configuration which facilitates mounting of the element.

According to an embodiment, the outer surface comprises at least one third groove extending from the second end to the second groove. The mentioned third groove has a spiral configuration.

According to an embodiment, the outer surface comprises at least two spiral-shaped third grooves positioned in a cross section of the element at equal angular positions relative to each other when the element is seen in axial direction.

According to an embodiment, the outer surface comprises at least one third groove extending from the second end to the second groove. The mentioned third groove has an axial configuration.

According to an embodiment, the outer surface comprises at least three axially directed third grooves positioned at equal angular positions relative to each other when the element is seen in axial direction.

According to an embodiment, the disclosed solution relates to a rock drilling machine. The rock drilling machine comprises a body and an impact device comprising a percussion piston movable inside the body in a reciprocating manner in an impact direction and return direction under influence of pressurized hydraulic fluid alternating in working pressure chambers of the impact device. The machine further comprises a piston guiding element for supporting a front end of the percussion piston to the body. The piston guiding element comprises at least one slide bearing section and a braking recess for decelerating the percussion piston. Hydraulic fluid is conveyed between the mentioned slide bearing section and the braking recess. Furthermore, the front end portion of the percussion piston is supported by means the piston guiding element comprising two successive slide bearing sections. Furthermore, the hydraulic fluid is conveyed between the mentioned two successive slide bearing sections. The piston guiding element is in accordance with the features disclosed in this document.

According to an embodiment, the mentioned portion between the two successive slide bearing sections is in connection to an impact pressure system of the impact device.

According to an embodiment, the impact device comprises a first working pressure chamber at a front end of the impact device. The hydraulic fluid is conveyed from the first working pressure chamber between the mentioned two successive slide bearing sections.

According to an embodiment, the portion between the two successive slide bearing sections is in connection to the impact pressure system via at least one pressure channel formed in the body of the rock drilling machine. Then cooler hydraulic oil can be conveyed to the piston guiding element compared to the oil of the first working pressure chambers at the front of the impact device.

According to an embodiment, pressurized hydraulic fluid is conveyed to the portion between the two successive slide bearing sections elsewhere than from the braking recess.

According to an embodiment, the disclosed solution relates to a method of supporting a front end portion of percussion piston of a rock drilling machine. The method comprises supporting the front end of the percussion piston to the body of the rock drilling machine by means of a sleeve-like piston guiding element which comprises at least one slide bearing section and a braking recess for decelerating the percussion piston. Hydraulic fluid is conveyed between the mentioned slide bearing section and the braking recess. The method further comprises providing the piston guiding element with at least one bearing sleeve and supporting the percussion piston by means of two slide bearing sections. The hydraulic fluid flow is directed between the slide bearing sections.

According to an embodiment, cooling the piston guiding element by means of the hydraulic fluid conveyed between the two slide bearing sections.

According to an embodiment, the solution relates also to a rock drilling rig. The rig comprises a movable carrier and one or more drilling booms connected movably to the carrier and equipped with rock drilling units. The mentioned rock drilling unit comprises a feed beam and a rock drilling machine supported movably on the feed beam. The rock drilling machine and its operation is in accordance with the features disclosed in this document.

According to an embodiment, the disclosed solution may be implemented also in hydraulic breaking machines which are intended to break rock material. The breaking machine comprises a body and an impact device comprising a percussion piston movable inside the body in a reciprocating manner in an impact direction and return direction under influence of pressurized hydraulic fluid alternating in working pressure chambers of the impact device. The machine further comprises a piston guiding element for supporting a front end of the percussion piston to the body. The piston guiding element comprises at least one slide bearing section and a braking recess for decelerating the percussion piston. Hydraulic fluid is conveyed between the mentioned slide bearing section and the braking recess. Furthermore, the front end portion of the percussion piston is supported by means the piston guiding element comprising two successive slide bearing sections. Furthermore, the hydraulic fluid is conveyed between the mentioned two successive slide bearing sections. The piston guiding element is in accordance with the features disclosed in this document.

The above disclosed embodiments may be combined in order to form suitable solutions having those of the above features that are needed.

BRIEF DESCRIPTION OF THE FIGURES

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION OF SOME EMBODIMENTS

Figure 1:
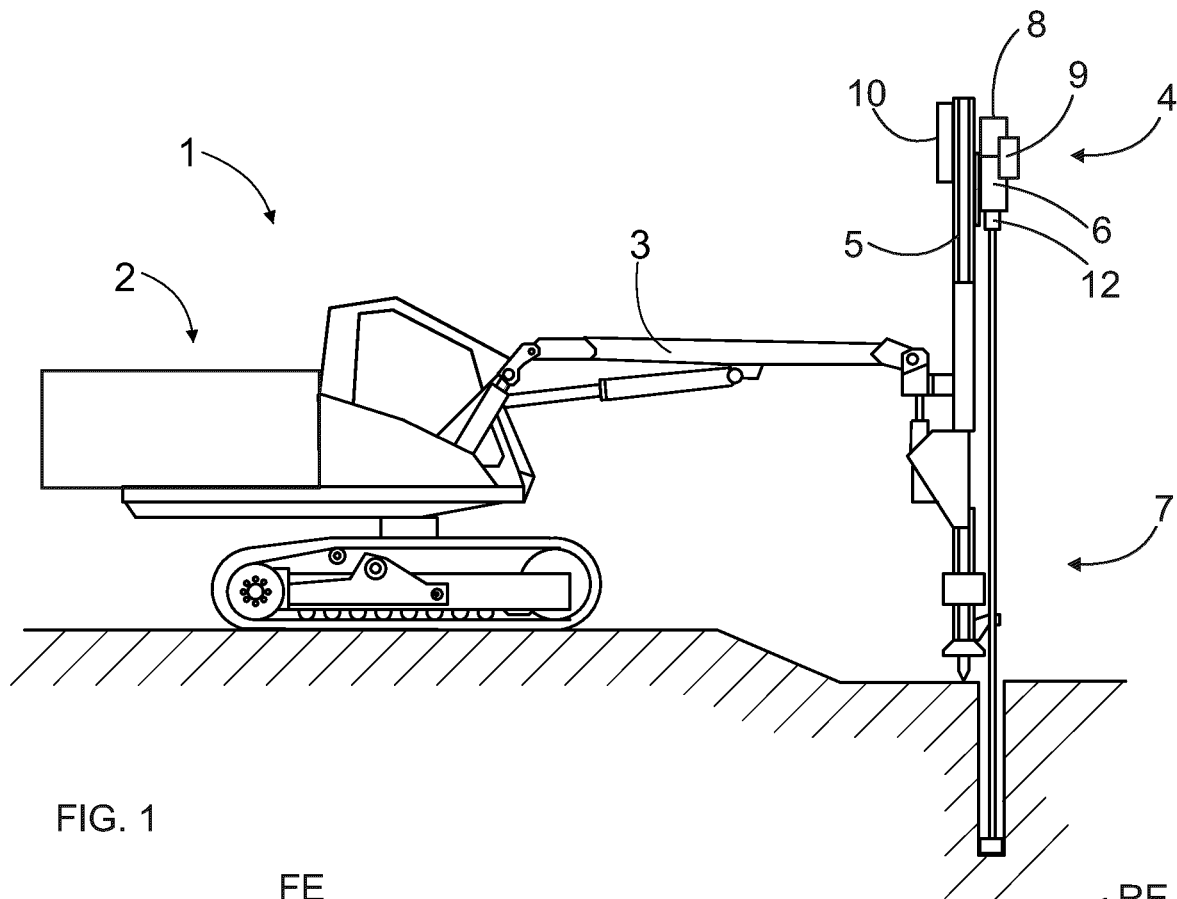
FIG. 1 is a schematic side view of a rock drilling rig for surface drilling and being provided with a drilling unit equipped with a hydraulic rock drilling machine.

FIG. 1 shows a rock drilling rig 1 intended for surface drilling. The rock drilling rig 1 comprises a movable carrier 2 and at least one drilling boom 3 connected to the carrier 2. At a distal end portion of the drilling boom 3 is a drilling unit 4 provided with a feed beam 5 and a rock drilling machine 6 supported on it. A drilling tool 7 is connectable to the drilling machine 6. The rock drilling machine 6 may comprise a shank adaptor at a front end of the rock drilling machine 6 for connecting the tool 7. The rock drilling machine 6 comprises an impact device 8 and a rotating device 9. The rock drilling machine 6 may be moved on the feed beam 5 by means of a feed device 10. The rock drilling machine 6 may be provided with a piston guiding element which is in accordance with the features disclosed in this document. Let it be mentioned that the disclosed piston guiding element may be utilized in any kind of hydraulic rock drilling machines utilizing a so-called top hammer principle. Further, the disclosed piston guiding element may be utilized in impact devices of hydraulic breaking hammers.

FIGS. 2-5 disclose a rock drilling machine 6 comprising a body 11, an impact device 8, a rotating device 9, a flushing housing 35, a shank adaptor 12, a gear housing 13 mounted at a front end of the body. The impact device 8 comprises an impact piston 14 for generating impact pulses to the shank adapter 12 connected to a tool 7 in an impact direction ID. The piston 14 moves in a reciprocating manner in the impact direction ID and return direction RD. The shank adaptor 12 is located at a front end FE of the drilling machine 6 and an end cover 15 is a distal component located at a rear end RE.

Figure 2:
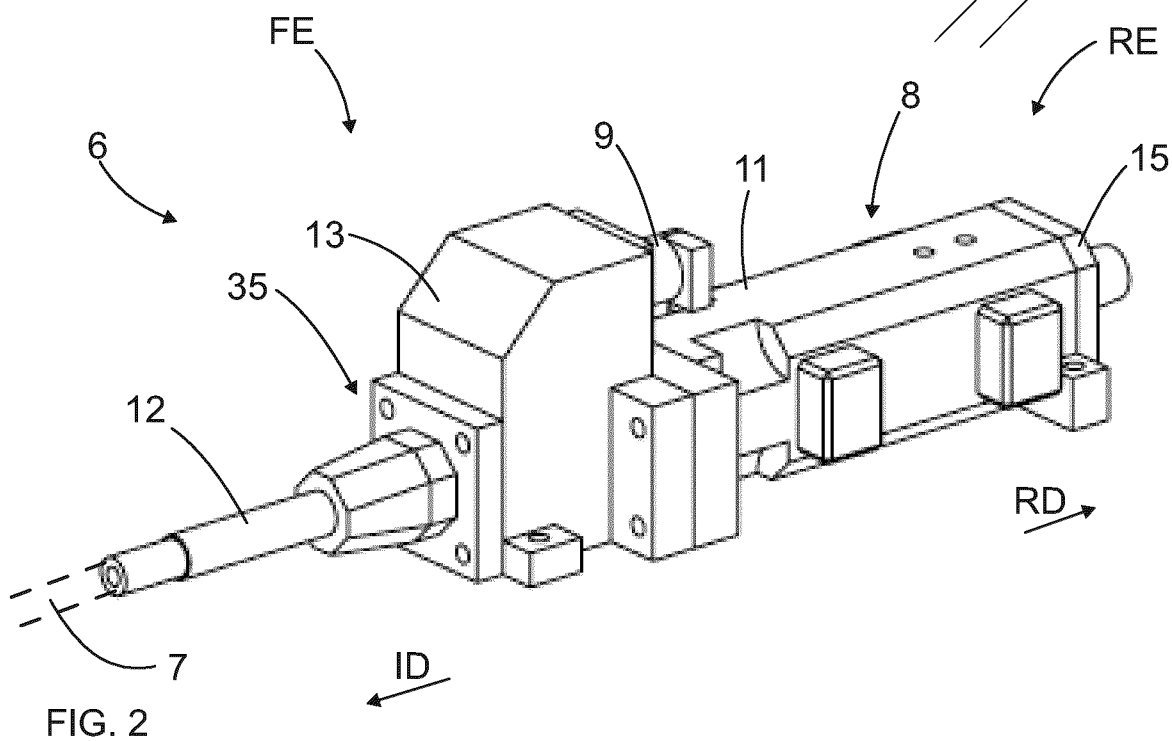
FIGS. 2 and 3 are schematic views of a hydraulic rock drilling machine.
Figure 3:
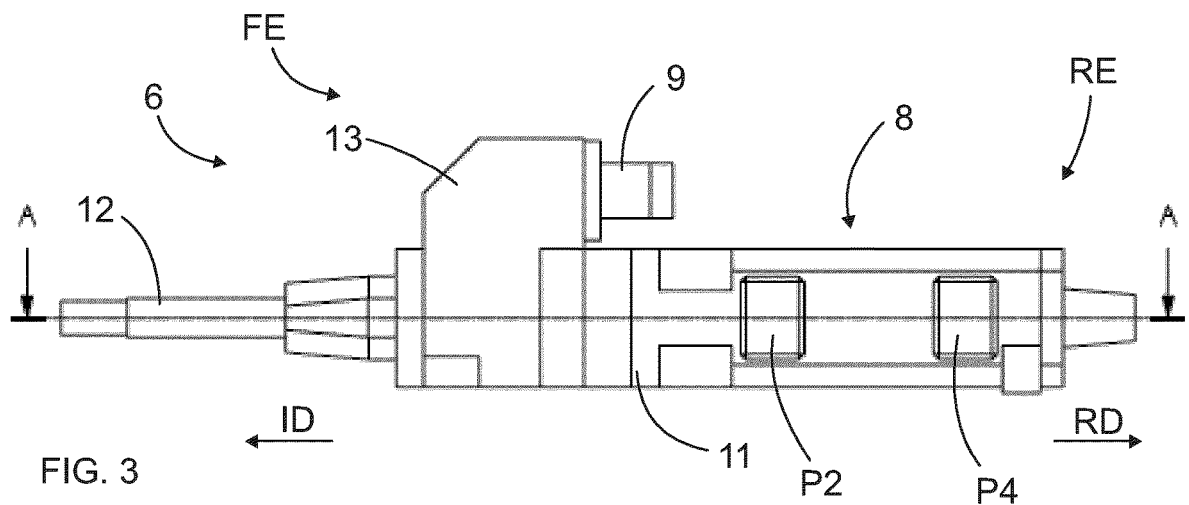
Figure 4:
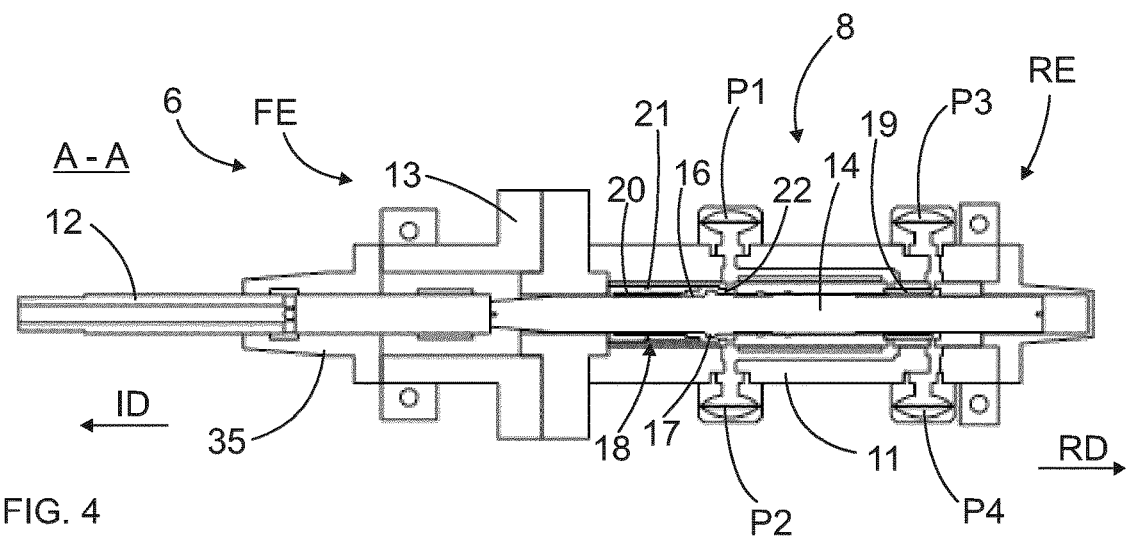
FIG. 4 is a schematic and cross-sectional top view of a rock drilling machine of FIGS. 2 and 3.
Figure 5:
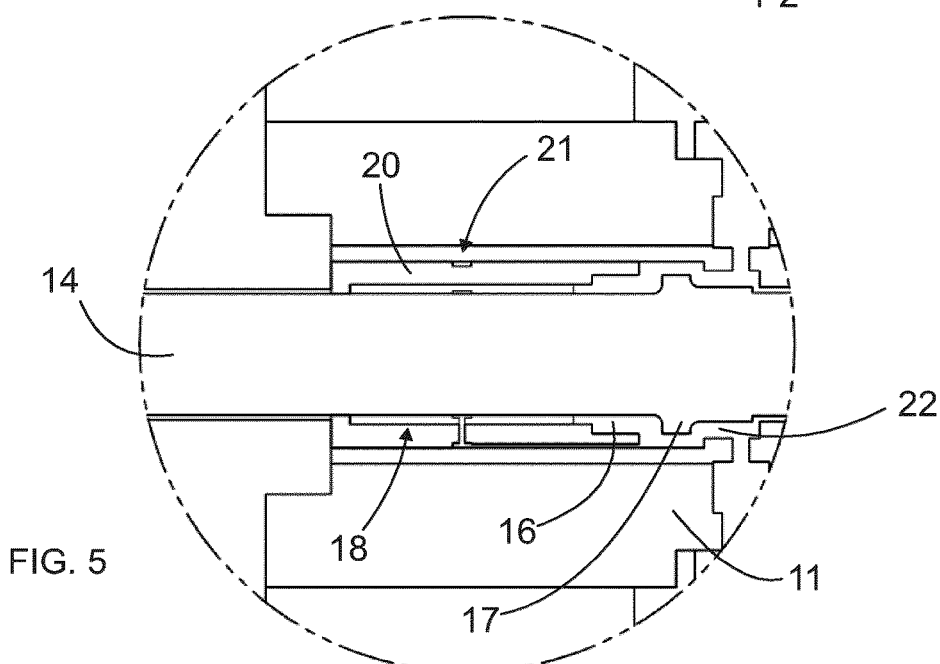
FIG. 5 is a schematic and cross-sectional view of a detail of FIG. 4, FIGS. 6 and 7 are schematic views of a piston guiding element.
Figure 6:
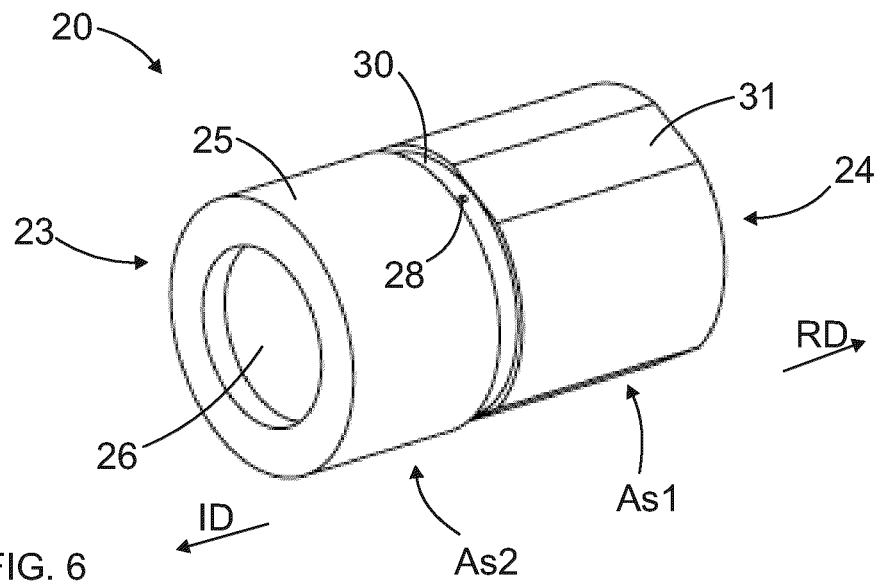

A front end of the piston 14 strikes to an impact surface, which is located at a rear end of the shank adaptor 12. In case the shank adaptor has moved forward and the impact surface has moved away from the designed impact position, then movement of the piston 14 is decelerated at the end of the impact movement by means of a braking recess 16. The braking recess 16 can receive a collar 17 of the piston and they can form together a closed pressure space. The piston 14 is supported to the body 11 by means of a front bearing 18 and a rear bearing 19, which may both be slide bearings. The front bearing 18 and the braking recess 16 are part of a piston guiding element 20, which is an elongated sleeve like piece surrounding a front part of the piston 14. The element 20 comprises two axially successive slide bearing portions and between them is feed system 21 for feeding hydraulic pressure fluid from the impact device 14, or from another fluid source. The body 11 may be provided with channels, grooves or other fluid conducting structures for allowing the feeding. Alternatively, or in addition to, on an outer surface of the element 20 may be fluid conducting grooves or other fluid conducting structures. FIGS. 2-4 show also pressure accumulators P1-P4 which are part of the hydraulic circuit of the impact device 8. The impact device 8 comprises several working pressure spaces for moving the percussion piston under influence of hydraulic pressure. For clarity reasons only a front most working pressure space 22 is indicated in FIG. 4. The working pressure space 22 is during the operation continuously connected to a high pressure system as well as the accumulators P1 and P2. The feed system 21 may be connected via the mentioned pressure feed paths to the working pressure space 22, whereby high pressure prevails between the slide bearing portions of the guide 20. Alternatively, high pressure hydraulic fluid can be fed from any other location or source. However, the pressure fluid is not directed from the braking recess to the feed system 21. The fed hydraulic fluid may leak through bearing clearances of the piston and may be collected at the front end FE and may then be directed to a discharge line of the hydraulic system.

FIGS. 6-10 disclose a piston guiding element 20 comprising a first end 23, second end 24, an outer surface 25 and an inner surface 26. The first end 23 is intended to be facing towards an impact direction ID of the percussion piston, whereas the opposite second end 24 is intended to be facing towards a return direction RD of the percussion piston. The second end 24 is provided with a braking recess 16 with a greater diameter on the inner surface 26. The braking recess 16 extends a first axial distance Ad1 from the second end 24 towards the first end 23. The inner surface 26 comprises a first groove 27 which is located at a second axial distance Ad2 from the braking recess 16. The element 20 is provided with one or more radial openings 28 between a bottom of the first groove 27 and the outer surface 25. The inner surface 26 comprises a first axial section As1 between the mentioned braking recess 16 and the first groove 27, and a second axial section As2 between the first groove 27 and the first end 23. Further, the element 20 comprises a separate bearing sleeve 29 mounted inside the element 20 and provided with the mentioned first and second axial sections As1, As2. The first and second axial sections As1, As2 comprise slide bearing material.

Figure 7:
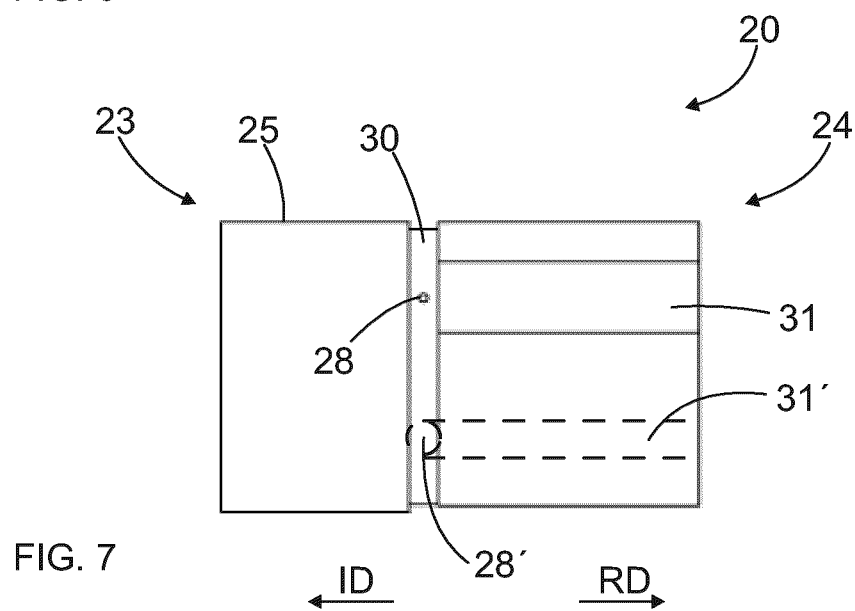
Figure 8:
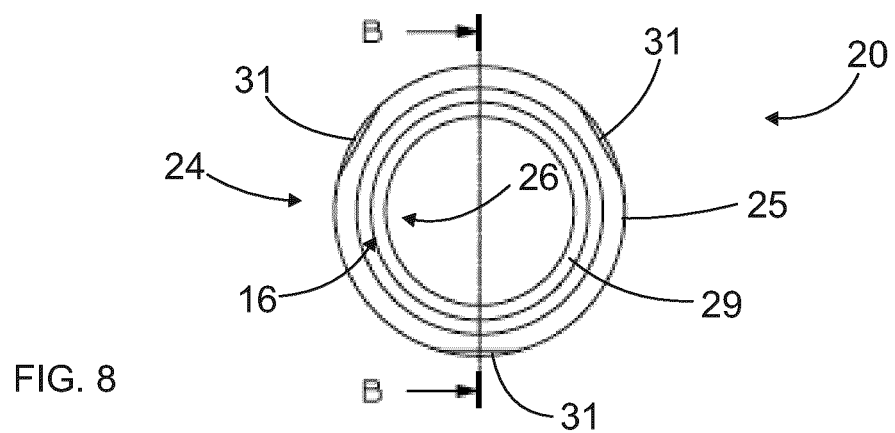
FIG. 8 is a schematic end view of the piston guiding element of FIGS. 6 and 7.
Figure 9:
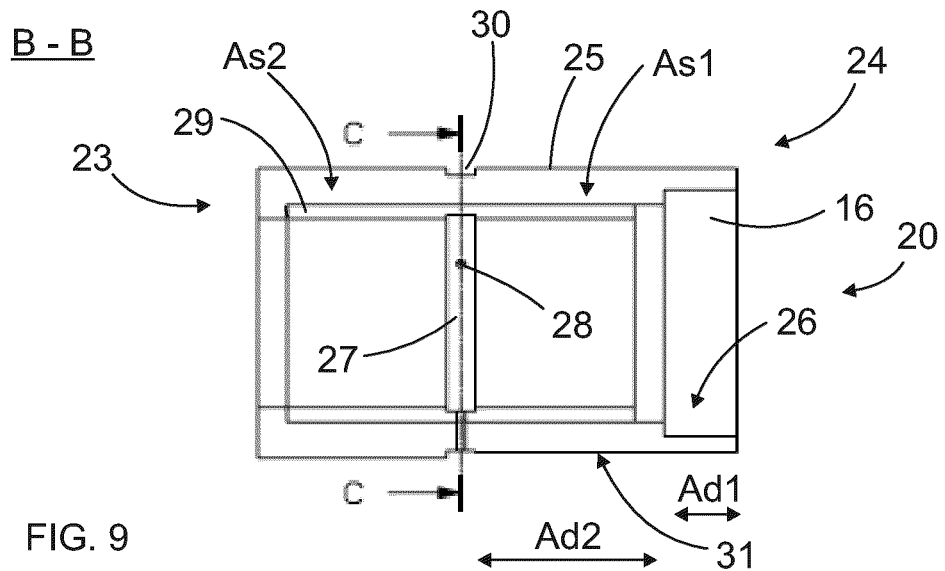
FIG. 9 is a schematic and cross-sectional view of the piston guiding element of FIGS. 6-8 seen at a cross-section B-B.
Figure 10:
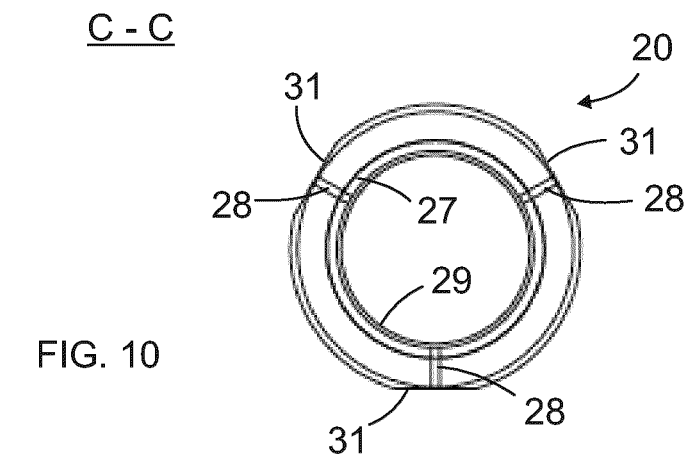
FIG. 10 is a schematic and cross-sectional view of the element seen at a cross-section C-C.

The outer surface 25 of the element 20 may comprise a second groove 30. The mentioned at least one radial opening 28 extends to a bottom of the second groove 30. Further, the outer surface 25 comprises one or more third grooves 31 extending from the second end 24 to the second groove 30. Hydraulic fluid may flow via the grooves 31 from the working pressures space 22 shown in FIG. 4 to the guide element 20. The third grooves may be axially directed and number of the grooves 31 may be one, two, three, four or even more. As can be seen in FIG. 7, there may be three grooves 31 evenly spaced on the periphery of the element 20.

In an alternative solution the guide element 20 may be without the second groove 30. Then the third groove 31' may end to the radial opening 28', as it is shown in FIG. 7 with broken lines.

Figure 11:
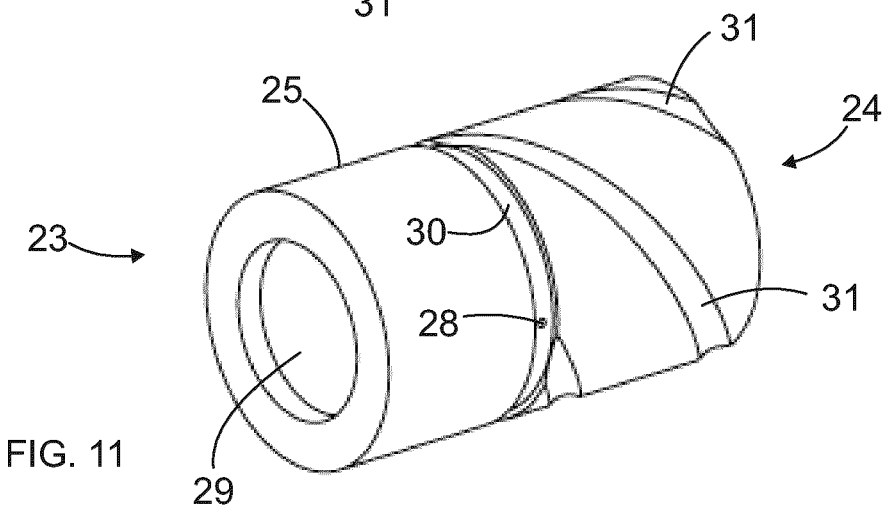
FIG. 11 is a schematic view of a piston guiding element provided with spiral-like grooves on its outer surface.

FIG. 11 discloses a guide element 20 which corresponds to the one shown in FIGS. 5-9 except that the third grooves 31 are not axially orientated but have instead spiral configuration.

Figure 12:
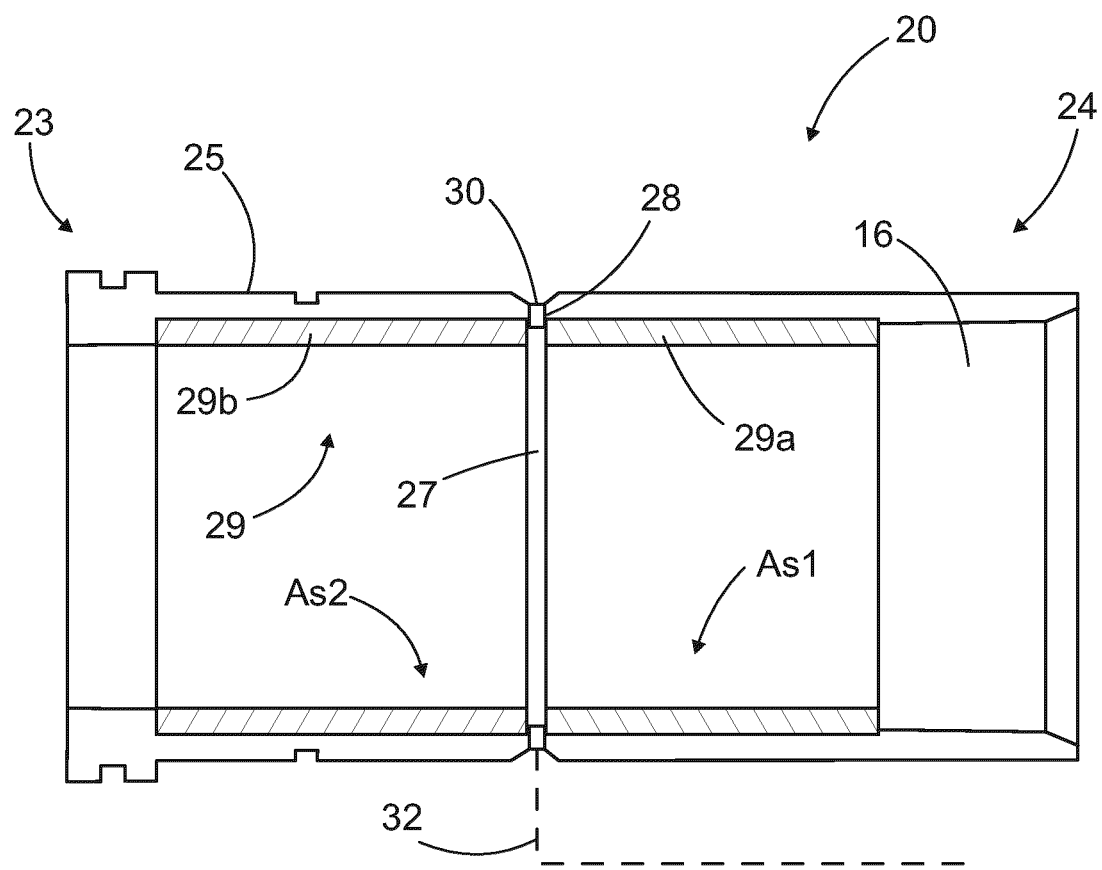
FIG. 12 is a schematic and cross-sectional view of a piston guiding element comprising two axially successive slide bearing elements.

FIG. 12 discloses a guide element 20 which comprises two separate bearing sleeves 29a, 29b mounted successively inside the element. A first bearing sleeve 29a is made of slide bearing material and is configured to form a first axial section As1. A second bearing sleeve 29b is made of slide bearing material and is configured to form a second axial section As2. A first groove 27 is located between the first and second bearing sleeves 29a, 29b. As can be noted the bearing sleeves 29a, 29b may have different axial length. Further, the bearing sleeves 29a, 29b may be made of different material and may have other different dimensions. Alternatively, the bearing sleeves 29a, 29b may be similar pieces.

FIG. 12 further discloses that hydraulic fluid can be conveyed through a dedicated pressure channel 32 to the second groove 30 or directly to the opening 28. The pressure channel 32 may be formed to a body of the impact device and it may be arranged to convey hydraulic fluid in low temperature to the guide 20, whereby the bearings are lubricated and cooled effectively.

Figure 13:
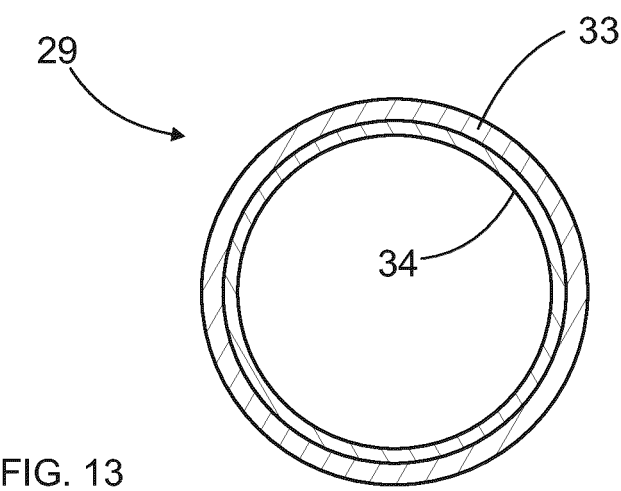
FIG. 13 is a schematic and cross-sectional view of a piston guiding element comprising slide bearing material on its inner surface side.

FIG. 13 discloses a bearing sleeve 29 comprising an outer basic sleeve 33 which may be made of steel, and an inner structure 34 which may be a coating layer made of slide bearing material. Alternatively, the structure may have a bi-material configuration wherein a steel material base 33 and a bearing bronze layer 34 are combined.

The drawings and the related description are only intended to illustrate the idea of the invention. In its details, the invention may vary within the scope of the claims.

The invention claimed is:

1. A piston guiding element arranged for providing support for a front end portion of a reciprocating percussion piston of a rock drilling machine, the element being a sleeve-like piece mountable inside a body of the rock drilling machine between the percussion piston and the body, the element comprising:
   a first end, an opposed second end, an outer surface and an inner surface, wherein the first end is arranged to be facing towards an impact direction of the percussion piston, wherein the opposite second end is arranged to be facing towards a return direction of the percussion piston and is provided with a braking recess having a greater diameter on the inner surface, and the braking recess extending a first axial distance from the second end towards the first end, the inner surface of the element having a first groove, which is located at a second axial distance from the braking recess;
   at least one radial opening located between a bottom of the first groove and the outer surface, the inner surface including a first axial section disposed between the braking recess and the first groove, and a second axial section disposed between the first groove and the first end; and
   at least one separate bearing sleeve mounted inside the element and provided with the first and second axial sections, wherein at least the mentioned first and second axial sections are made of a slide bearing material, wherein the outer surface includes a second groove, the at least one radial opening extending to a bottom of the second groove, and wherein the outer surface includes at least one third groove extending from the second end to the second groove.

2. The element as claimed in claim 1, wherein the bearing sleeve mounted inside the element is one single piece and is provided with the first and second axial sections.

3. The element as claimed in claim 1, wherein the at least one separate bearing sleeve is made of the slide bearing material.

4. The element as claimed in claim 1, wherein an inner surface of the at least one bearing sleeve includes at least one layer made of at least one slide bearing material.

5. The element as claimed in claim 1, wherein the element comprises two separate bearing sleeves mounted successively inside the element, a first bearing sleeve being configured to form the first axial section, a second bearing sleeve being configured to form the second axial section, and the first groove being located between the first and second bearing sleeves.

6. The element as claimed in claim 1, wherein an outer diameter at the second axial section between the second groove and the first end is greater than an outer diameter at the first axial section between the braking recess and the second groove, whereby the outer surface of the element has a stepped configuration.

7. A rock drilling machine, comprising:
   a body;
   an impact device including a percussion piston movable inside the body in a reciprocating manner in an impact direction and a return direction under influence of a pressurized hydraulic fluid alternating in working pressure chambers of the impact device; and
   a piston guiding element in accordance with claim 1 arranged for supporting a front end portion of the percussion piston to the body, the piston guiding element including at least one slide bearing section and a braking recess for decelerating the percussion piston, wherein hydraulic fluid is conveyed between the slide bearing section and the braking recess, wherein the front end portion of the percussion piston is supported by means of the piston guiding element, the piston guiding element having two successive slide bearing sections, hydraulic fluid being conveyed between the two successive slide bearing sections.

8. The rock drilling machine as claimed in claim 7, wherein a portion between the two successive slide bearing sections is connected to an impact pressure system of the impact device.

9. The element as claimed in claim 1, wherein the outer surface includes at least one third groove extending from the second end to at least one radial opening.

10. The element as claimed in claim 9, wherein the at least one third groove has a spiral configuration.

11. The element as claimed in claim 9, wherein the at least one third groove has an axial configuration.

12. The element as claimed in claim 1, wherein the at least one third groove has a spiral configuration.

13. The element as claimed in claim 1, wherein the at least one third groove has an axial configuration.

14. A method of supporting a front end portion of a percussion piston of a rock drilling machine, the method comprising:
   supporting the front end portion of the percussion piston on a body of the rock drilling machine by means of a sleeve-like piston guiding element including at least one slide bearing section and a braking recess for decelerating the percussion piston;
   conveying hydraulic fluid between the slide bearing section and the braking recess;
   providing the piston guiding element with at least one bearing sleeve;
   supporting the percussion piston by means of two slide bearing sections and directing the hydraulic fluid flow between the two slide bearing sections; and
   cooling the piston guiding element by the hydraulic fluid conveyed between the two slide bearing sections.

* * * * *